United States Patent
Johansson

(10) Patent No.: US 10,264,200 B2
(45) Date of Patent: Apr. 16, 2019

(54) RANDOM SAMPLING FOR HORIZONTAL NOISE REDUCTION

(71) Applicant: OMNIVISION TECHNOLOGIES, INC., Santa Clara, CA (US)

(72) Inventor: Robert Johansson, Oslo (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 89 days.

(21) Appl. No.: 15/390,292

(22) Filed: Dec. 23, 2016

(65) Prior Publication Data

US 2018/0184022 A1   Jun. 28, 2018

(51) Int. Cl.
*H04N 5/217* (2011.01)
*H04N 5/378* (2011.01)

(52) U.S. Cl.
CPC .................................. *H04N 5/378* (2013.01)

(58) Field of Classification Search
CPC ..................................................... H04N 5/3575
See application file for complete search history.

(56) References Cited

U.S. PATENT DOCUMENTS

| 7,518,647 B2 | 4/2009 | Kim et al. | |
| 2009/0040351 A1* | 2/2009 | Cho | H04N 5/3575 348/308 |
| 2011/0261233 A1* | 10/2011 | Zhang | H04N 5/335 348/241 |
| 2012/0002254 A1* | 1/2012 | Ogawa | H04N 1/46 358/513 |
| 2014/0184568 A1* | 7/2014 | Kim | G06F 3/0412 345/175 |

OTHER PUBLICATIONS

Snoeij, et al; A CMOS Imager With Column-Level ADC Using Dynamic Column Fixed-Pattern Noise Reduction; IEEE Journal of Solid-State Circuits; Dec. 2006 (Year: 2006).*
ROC (Taiwan) Patent Application No. 106145188—Office Action with English Translation dated Nov. 29, 2018, 13 pages.

* cited by examiner

*Primary Examiner* — Gary C Vieaux
(74) *Attorney, Agent, or Firm* — Christensen O'Connor Johnson Kindness PLLC

(57) ABSTRACT

An example apparatus for random sampling for horizontal noise reduction includes readout circuitry coupled to receive image data from an array of pixels, the readout circuitry including a plurality of sample and hold (S&H) circuits coupled to respective ones of a plurality of bitlines to sample and hold the image data in response to a plurality of S&H control signals, each of the plurality of S&H circuits including an S&H capacitor and an S&H switch. The S&H capacitor samples and holds respective image data, and the S&H switch coupled between a respective bitline and the respective S&H capacitor, and further coupled to receive a respective one of the plurality of S&H control signals to open/close the S&H switch, where each of the plurality of S&H switches are opened to decouple their respective S&H capacitors from the respective bitlines at a different time.

16 Claims, 3 Drawing Sheets

RANDOM SAMPLING FOR HORIZONTAL NOISE REDUCTION

TECHNICAL FIELD

This disclosure relates generally to image sensors, and in particular but not exclusively, relates to randomizing row sampling to reduce row-wise noise in an image sensor.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Row-wise noise currently limits performance of image sensor devices and may generate bands in an image. Ideally through sampling techniques and other noise reduction methods, the row-wise noise may be reduced or eliminated. However, some row-wise noise may not be reduced or eliminated by the prior techniques and methods. In some instances, the frequency of the noise may be a factor in whether or not it may be reduced or eliminated.

Many techniques have been employed to mitigate the effects of row-wise noise and enhance image sensor performance. However, some of these methods may not entirely eliminate the effects.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
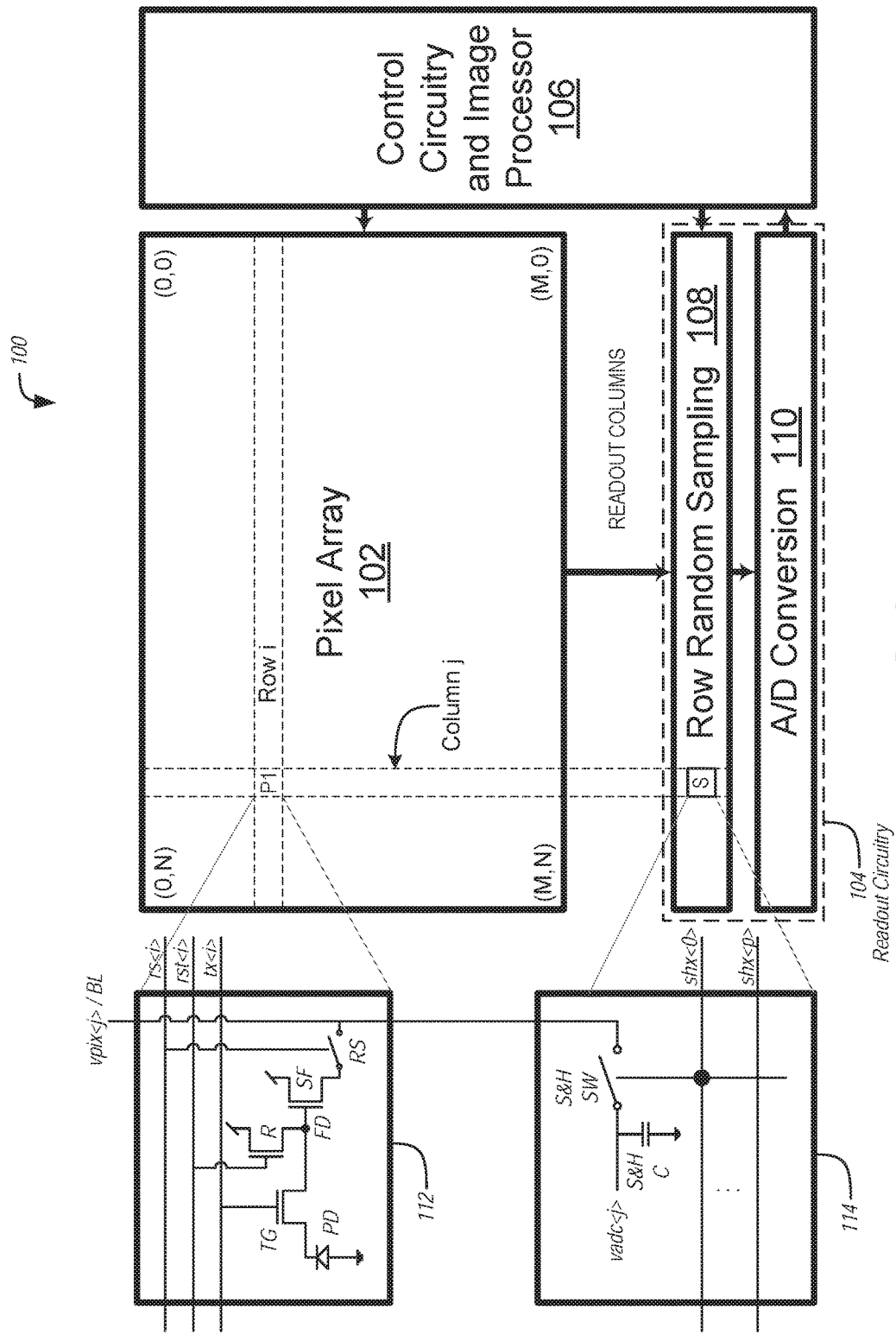
FIG. 1 illustrates one example of an imaging system 100 in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for row-wise noise reduction in an image sensor are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 illustrates one example of an imaging system 100 in accordance with an embodiment of the present disclosure. Imaging system 100 includes pixel array 102, readout circuitry 104, and control circuitry and image processor 106. In some embodiments, the control circuitry and the image processor may be separated into two or more functional blocks. In one example, pixel array 102 is a two-dimensional (2D) array of photodiodes, or image sensor pixels (e.g., pixels (0,0) through (M,N)). As illustrated, photodiodes are arranged into rows (Row i is shown in FIG. 1) and columns (Column j is shown in FIG. 1) to acquire image data of a person, place, object, etc., which can then be used to render a 2D image of the person, place, object, etc. However, photodiodes do not have to be arranged into rows and columns and may take other configurations. As illustrated, a pixel P1 is located at the crossing of Row i and Column j.

The pixel P1 is illustrated in inset 112, which provides an example schematic of P1. The illustrated embodiment of P1, as shown in inset 112, includes a photodiode PD, a transfer gate TG, a floating diffusion FD, a reset gate R, a source follower transistor SF, and a row select switch RS. The inset 112 shows what may be termed at 4T pixel, which implies that P1, and by extension each pixel of the pixel array 102, is formed from four transistors. While the inset 112 may only show three transistors, the switch labeled RS may be formed from a transistor in some embodiments.

The transfer gate TG may be a transistor coupled between the PD and the FD and having a gate terminal coupled to a control line tx<i>. A transfer control signal on tx<i> may enable TG, which may cause charge generated in PD, due to image light for example, to transfer to FD. The reset transistor R may be coupled between a reference voltage and FD, and may have a gate terminal coupled to a control line rst<i>. Enablement of the reset transistor R due to a reset control signal on rst<i> may couple FD to the reference voltage, which may be a high voltage in some embodiments, to bring a potential on FD to the reference voltage level. The SF transistor may be coupled between the high reference voltage and one side of the row select switch RS, and may have a gate terminal coupled to FD. The other side of RS may be coupled to a bitline, labeled vpix<j>/BL in FIG. 1.

Additionally, RS may be coupled to a control line rs<i>, which may couple SF to the bitline in response to a row select control signal.

In operation, FD may be reset to the high reference voltage due to a control signal on rst<i> enabling reset transistor R. After or before FD is reset, image light may be provided to, e.g., incident on, the PD to generate the image charge. In response to a control signal on tx<i>, TG may be enabled, which may result in the image charge being transferred to FD. The image data on FD, which is coupled to the gate of SF, may enable SF to an amount indicative of the level of the image charge. With SF enabled, a control signal on rs<i> may couple SF to the bitline, which may provide image data, e.g., pixel voltage, to the bitline. The image data may be the voltage/current generated by the source follower SF transistor based on the image charge on the gate terminal of the source follower SF transistor.

In one example, after each image sensor photodiode/pixel in pixel array 102 has acquired its image data or image charge, the image data is readout by readout circuitry 104 and then transferred to control circuitry and image processor 106. Readout circuitry 104 may be coupled to readout image data from the plurality of photodiodes in pixel array 102 via a plurality of readout columns, which may also be referred to as vpix<j>/BL or bitlines. In various examples, readout circuitry 104 may include amplification circuitry, analog-to-digital conversion (ADC) circuitry 110, row random sampling circuitry 108, or otherwise.

The illustrated embodiment of readout circuitry 104 includes the row random sampling circuitry 108 coupled to the bitlines and the A/D conversion 110 coupled to the row random sampling circuitry 108. The row random sampling circuitry 108 may include a plurality of control lines coupled to receive control signals from the control circuitry and image processor 106 to control sample and hold (S&H) circuits, as shown in the insert 114. The A/D conversion circuitry 110 may be coupled to receive an output of the S&H circuit of each bitline. The A/D conversion circuitry 110 may convert the image data, e.g., pixel voltage, to a digital representation of the same. In some embodiments, correlated double sampling (CDS) may be performed, which includes doing A/D conversion on a reference voltage, e.g., dark state voltage, from a pixel, performing A/D conversion on the image data, e.g., a signal voltage, then taking the difference to provide the digital representation of the image data.

The illustrated embodiment of the S&H circuitry shown in insert 114 includes an S&H switch (S&H SW) and an S&H capacitor (S&H C), and a couple of shx<X> control lines are also shown. For ease of reference, the S&H control circuitry that includes the S&H SW and the S&H C may be referred to as S&H circuitry 114. Each bitline of the pixel array 102 may be coupled to a respective instance of the S&H circuitry 114. For example, an S&H SW and an S&H C may be coupled to each bitline of the pixel array 102. Additionally, each S&H SW may be coupled to one of the control lines shx<X>, such as shx<0>, shx<1>, . . . , shx<p>, which may also be referred to as S&H control lines. In some embodiments, the S&H control lines may be hardwired to one or more of the S&H circuitry 114. The S&H SW may further be coupled to dynamically couple/decouple the S&H C from a respective bitline in response to an S&H control signal received on one of the control lines shx<X>. In operation, the coupling of an S&H C to a respective bitline via a respective S&H SW may cause the S&H C to charge to a voltage level of vpix<j>, which may remain on the S&H C after the S&H SW is opened. The vpix<j> on the S&H C may then be used for the A/D conversion performed by the A/D conversion circuitry 110.

In some embodiments, adjacent S&H SWs may be coupled to a different one of the control lines shx<X>. Additionally, the sample and hold (S&H) control signals on each of the control lines shx<X> may have a different width. In some embodiments, the S&H control signals on each control line shx<X> may transition high, e.g., close the associated S&H SW, concurrently, but may open their respective S&H SWs at a different time. In some embodiments, the different times the S&H SWs are opened may be randomized across the row of pixels for the pixel array 102. By randomizing the opening of the S&H SWs across a row, an amount of noise included in individual pixel voltages may also be randomized, assuming the noise is time varying within a randomization time trand (see FIG. 2B). As such, the randomized noise may reduce or eliminate row noise that may be perceived as a band across an image if each S&H SW across the row is opened simultaneously. In some embodiments, the randomization across the row may be broken into smaller blocks of four, eight, or 16 bitlines, and repeated across the row.

Control circuitry and image processor 106 may simply store the image data or even manipulate the image data by applying post image effects (e.g., crop, rotate, remove red eye, adjust brightness, adjust contrast, or otherwise). In one example, readout circuitry 104 may readout a row of image data at a time along the readout column lines (illustrated) or may readout the image data using a variety of other techniques (not illustrated), such as a serial readout or a full parallel readout of all pixels simultaneously.

In one example, control circuitry and image processor 106 is coupled to pixel array 102 to control operation of the plurality of photodiodes in pixel array 102. For example, control circuitry and image processor 106 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

Additionally, the control circuitry and image processor 106 may be coupled to the row random sampling circuitry 108 to provide the S&H control signals to the plurality of S&H circuitry 114 coupled to each of the readout columns, e.g., bitlines of the pixel array 102. The S&H control signals may be provided during the transfer of image data, e.g., pixel voltage, to the readout circuitry 104. The control circuitry and image processor 106 may be coupled to provide the S&H control signals so that each S&H SW of each bitline is simultaneously closed so that the pixels of Row i, for example, begins charging their respective S&H C. However, the control circuitry and image processor 106 may be coupled to open the S&H SWs at different times to alter the sampling of the pixel voltage and any row noise that may be present.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2A:
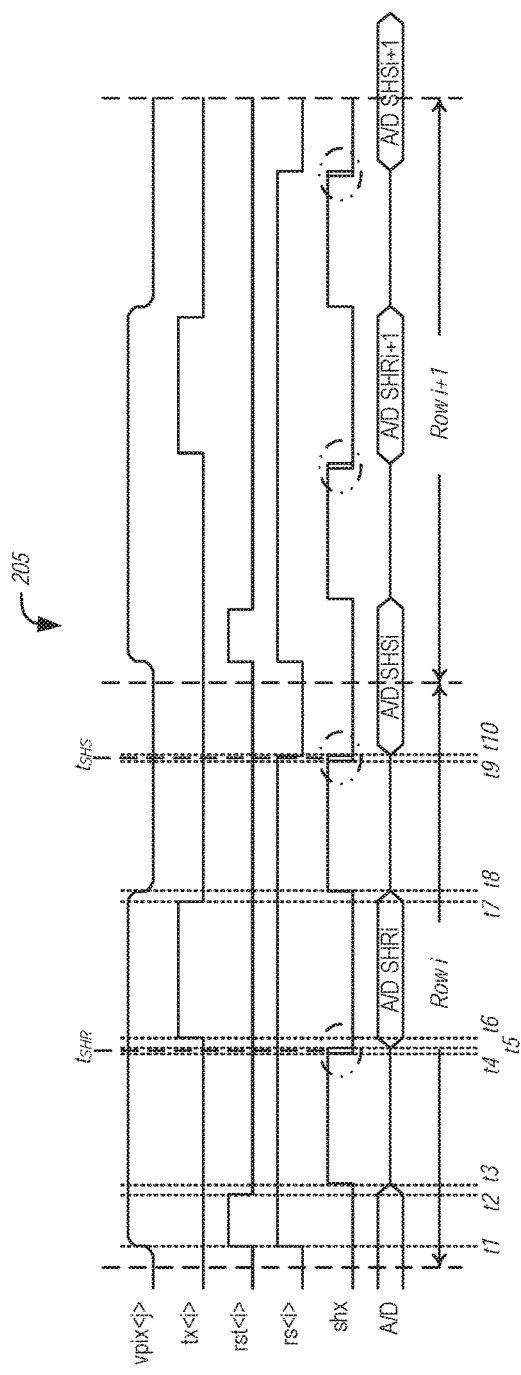
FIG. 2A is an example timing diagram 205 in accordance with an embodiment of the present disclosure.

FIG. 2A is an example timing diagram 205 in accordance with an embodiment of the present disclosure. The timing diagram 205 will be used to illustrate the random sampling of pixels of the image sensor 100 to reduce horizontal noise that may be present and perceptible in an acquired image, for example. The timing diagram 205 includes control signals on control lines tx<i>, rst<i>, rs<i>, shx, and A/D, and image data/pixel voltage vpix<j>. The control signals on control lines tx<i>, rst<i>, and rs<i> are associated with the transfer of the image data/pixel voltage from pixel P1, and the image data vpix<j> is the image data/pixel voltage from the pixel P1, which is at the crossing of Row i and Column j, as shown in FIG. 1. The control signal shx represents S&H control signals on random sampling control lines shx<X>, and the A/D control signal controls the A/D conversion of vpix<j>, e.g., the pixel voltage. It should be noted that the control signals and the respective control lines may be referred to using the same nomenclature, and that reference to the control signal or the control line may mean the components the control lines/signals are coupled to are manipulated accordingly. Further, reference to a control signal implies that the control signal is provided on the associated control line, and may be provided by the control circuitry and image processor 106. For example, a row select control signal is provided on the rs<i> control line, but referring to a row select control signal as rs<i> implies that the row select control signal is provided on the row select control line.

The image data/pixel voltage vpix<j> changes over time due to a variety of reasons. First, a bias voltage, which may represent a baseline voltage for the bitline, may be coupled to the bitline to cause vpix<j> to increase to the bias voltage. In some embodiments, the bias voltage may be the high voltage reference or a derivative thereof, and may be coupled to the bitlines prior to the readout of reference and signal image data. Additionally, when the row select control signal on rs<i> is at a high logic level, the source follower transistor SF of pixel P1 may be coupled to the associated bitline, which may cause the voltage vpix<j> to deviate from the bias voltage. In general, image data coupled to the bitline may cause vpix<j> to decrease from the bias voltage level, and the amount of decrease may provide some indication of the image data.

As noted above, the transfer control signal on tx<i> enables the transfer gate TG of a pixel, the reset control signal on rst<i> resets the floating diffusion FD of the pixel, and rs<i> couples the output of the source follower transistor SF to the associated bitline, which provides the pixel voltage vpix<j> to the bitline.

The control signal shx causes an S&H SW to couple a respective S&H C to a respective bitline, which charges the S&H C to vpix<j>. The pixel voltage vpix<j> may subsequently be provided to the A/D conversion circuitry 110 for A/D conversion. Each control signal shx may have a different width based on a different time the shx signal transitions low. In general, the transition to a high logic level of the shx control signal may cause the S&H SWs to close, thereby coupling a respective bitline to a respective S&H C, and the transition to a low logic level may decouple the bitlines from the S&H C.

Figure 2B:
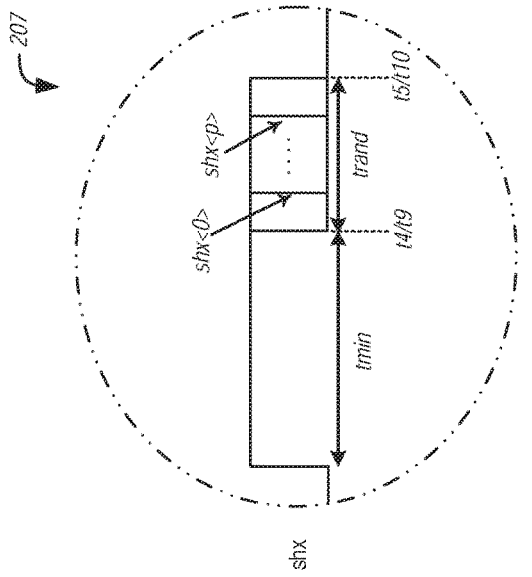
FIG. 2B shows an example shx control signal for controlling the S&H switches in accordance with an embodiment of the present disclosure.

FIG. 2B shows an example shx control signal for controlling the S&H switches in accordance with an embodiment of the present disclosure. The shx control signal may be an example of the shx control signals shown in FIG. 2A.

The illustrated embodiment of the shx control signal has a minimum hold time tmin, and a random additional hold time trand. Alternatively, the shx control signals may be characterized as having a minimum pulse width plus some additional randomized pulse width. The shx control signals may be provided over a plurality of S&H control lines, such as p-control lines. The number of S&H control lines may range from 2 to 16, or more, and each of the S&H control signals on the p-control lines may have a different additional hold time, e.g., trand. Further, the p-control lines may be coupled to p-bitlines, or p-S&H SWs of the p-bitlines. As such, if there are more than p-bitlines in a pixel array, the p-control lines may repeat for every p-bitlines. For example, if shx<0> is coupled to bitline A, then shx<0> may also be coupled to bitline A plus p. Accordingly, the coupling of p-shx control to p-bitlines, which may be random, may be repeated for every p-bitlines.

The minimum hold time tmin may be a minimum time for vpix<j> to stabilize and to charge the S&H Cs accordingly. The random additional hold time trand may be different for adjacent pixels of Row i, and may vary the time at which the shx control signals transition low, e.g., opens S&H SWs. The random additional hold time trand may be different for adjacent pixels in the ith Row so that any row-wise noise may be sampled at a different time across the row. For example, S&H SW of bitline 0 may be controlled by shx<0>, while S&H SW of bitline p may be controlled by shx<p>, where the trand of shx<0> is shorter than trand for shx<p>. As such, the row-wise noise may be segmented into pixel-wise noise for any row-wise noise that may be changing in the time of trand. The pixel-wise noise may be less perceptible to a viewer of an image over row-wise noise. For example, by varying trand across each row of the array 102, for example, the amount of noise included in vpix<j> of adjacent pixels of Row i may vary, especially if the row-wise noise varies during trand. By charging adjacent S&H Cs for random amounts of time, the associated vpix<j> may include different levels of row noise, which may reduce the row noise perceptibility. In some embodiments, tmin may be around 900 nanoseconds, and trand may vary from zero to 100 nanoseconds.

In regards to FIG. 2A, the timing diagram 205 shows the transfer of image data, e.g., pixel voltage, for A/D conversion for two rows, Row i and Row i+1. The timing for the two rows is substantially similar, so only Row i will be discussed in detail. It should also be noted that the timing diagram shows the A/D conversion of the dark state or reference for each pixel on Row i and the A/D conversion of the signal, e.g., pixel voltage due to image light, so that CDS may be performed. It should also be noted that the control signals shown in the timing diagram 205 apply to all pixels of Row i, and that the control signals cause associated couplings/decouplings to occur substantially simultaneously across the row of pixel, except where noted.

With reference to timing diagram 205, at time t1 the reset control signal and row select control signal on rst<i> and rs<i>, respectively, transition high. As a result, the floating diffusions FD are reset to a high voltage value and the source follower transistors are coupled to a respective bitline for all pixels in Row i. About the same time, vpix<j> for each column/bitline may transition to high due to the high voltage on the floating diffusion. At time t2, rst<i> transitions low, which disables the reset transistor R and decouples the floating diffusion FD from the high reference voltage.

At time t3, the S&H control signals shx transition high, which causes the S&H SW for each bitline of the pixel array 102 to close. Closing the S&H SWs allows for the sample and hold of the reference voltage (SHR) on respective S&H Cs from each pixel in Row I, which may be used for A/D conversion and CDS, for example. As a result, each S&H C of S&H circuitry 114 may be coupled to their respective bitlines due to their respective S&H SWs being closed. Further, each S&H C coupled to each bitline may begin to charge to a vpix<j> level based on the image data on a respective bitline/pixel. After time t3 plus tmin (see FIG. 2B), each S&H C may be fully charged to their respective vpix<j> level. It should be noted that the pixel voltage coupled to the bitlines at time t1 may represent the reference pixel voltage since the image charge has yet to be transferred to the FDs.

At time t4, a first one of the S&H SWs may be opened, resulting in their respective S&H C being decoupled from the respective bitline. The time at which the S&H SW is opened may be considered the sampling time because the voltage present on the bitline will be stored on the S&H C. The sampling time is labeled tSHRi in FIG. 2A, and each pixel of Row i may have a slightly different sampling time due to their different trand times. The voltage includes both the image data and any noise in the system/pixel voltage, which may include row-wise noise. Adjacent pixels, such as pixel j−1 and j+1 may have their respective S&H SWs opened at different times, which may cause their pixel voltages, such as vpix<j−1> and vpix<j+1>, to be different since the different times their S&H SWs are open may allow time variations in the row-wise noise to be incorporated into the pixel voltage. As such, the row-wise noise may effectively be changed into pixel-wise noise, which may reduce the perceptibility of the noise to a viewer. Between times t4 and t5, the S&H SWs may be opened at different times across the ith Row so that all pixels have been sampled by time t5. As such, time t5 may be the time the last S&H SW is opened resulting in the respective S&H C being decoupled from the respective bitline. The row of pixel voltages captured at and between times t4 and t5 may be converted into digital representations by the A/D control signal(s).

At time t6, control signal tx<i> transitions high, which enables the transfer gates of the pixels of Row i to transfer their respective image charge, e.g., signal voltage, to their respective floating diffusions. Since the row select rs<i> control signal is still high, the image charge on the floating diffusions FD cause the respective source follower transistors SF to charge the bitlines to respective signal pixel voltages associated with the image data. The image data is indicated by the reduction in vpix<j> in FIG. 2A. At time t7, the tx<i> control signal transitions low to decouple the photodiodes PD from their respective floating diffusions FD.

At time t8, the shx control signals transition back high to couple the bitlines to their respective S&H C by closing respective S&H SWs. Closing the S&H SWs allows for the sample and hold of the signal voltage (SHS) on respective S&H Cs from each pixel in Row I, which may be used for A/D conversion and CDS, for example. At time t9 through t10, the shx signals across Row i randomly transition low to capture the image data voltage vpix<j> for each pixel at a different time, and is indicated by the signal sample time tSHSi. The image data may then go through an A/D conversion. Additionally, at time t10 the row select control signal on rs<i> may transition low to decouple the source follower transistors of Row i from their respective bitlines. The process may then repeat for row i+1.

Figure 3A:
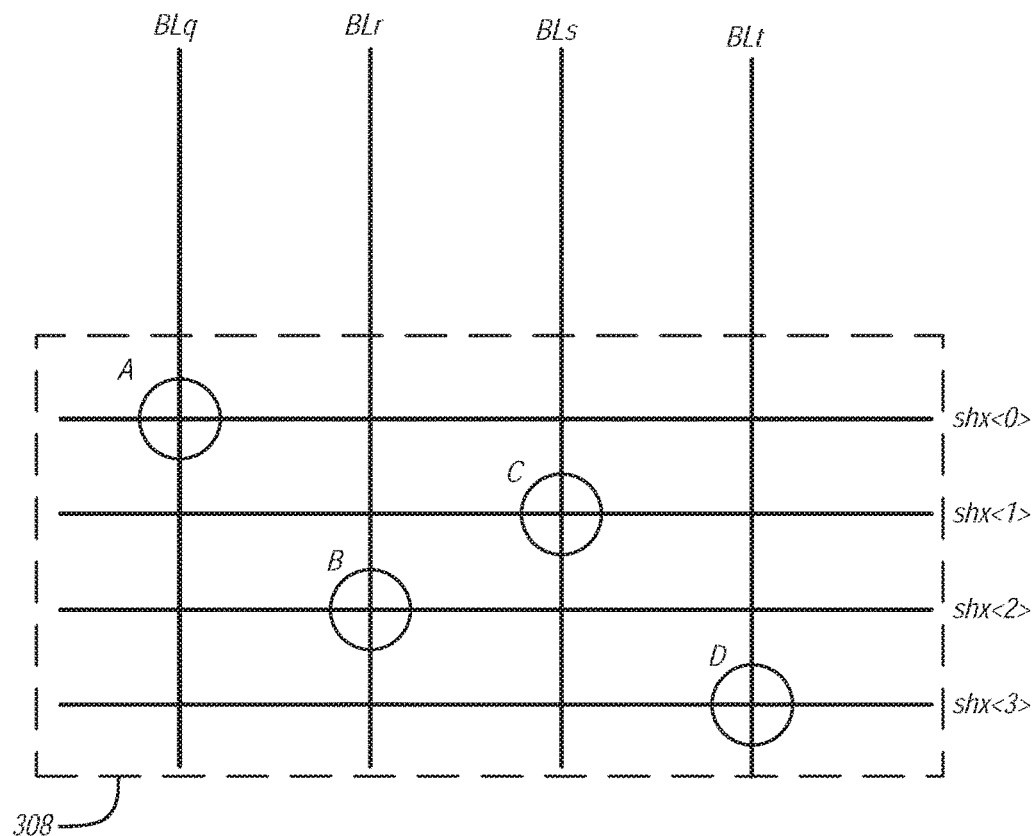
FIG. 3A is an example of the row random sampling circuitry 308 in accordance with an embodiment of the present disclosure.

FIG. 3A is an example of the row random sampling circuitry 308 in accordance with an embodiment of the present disclosure. The row random sampling circuitry 308 may be an example of the row random sampling circuitry 108. The illustrated embodiment of row random sampling circuitry 308 include a plurality of S&H control lines shx<X> intersecting with a plurality of bitlines BLX. The row random sampling circuitry 308 may couple control circuitry, such as control circuitry and image processor 106, to S&H control circuitry to control the coupling of bitlines to the S&H C for A/D conversion of reference and signal pixel voltages.

The illustrated S&H control lines shx<X> includes lines shx<0>, shx<1>, shx<2>, and shx<3>. While four S&H control lines are shown, any number of control lines are covered by the present disclosure, such as two, eight, 16, and so on. In some embodiments, the S&H control lines may be hardwired coupled to the S&H control circuitry, such as the S&H control circuitry 114. However, adjacent S&H control circuitry, and their respective bitlines, of the pixel array may not be coupled to the same S&H control line. Instead, the S&H control lines shx<X> may be randomly coupled to one or more bitlines. For example, if there are four S&H control lines, then the coupling of the four S&H control lines may be randomly coupled to four sequential bitlines so long as adjacent bitlines are not coupled to the same S&H control line. In some embodiments, the coupling of the four S&H control lines may be repeated for every four bitlines across a row of pixels. For example, S&H control line shx<0> may be coupled to bitline BL0 and also coupled to bitline 4, 8, 12, etc. In embodiments where there are eight S&H control lines, for example, the eight S&H control lines may be coupled to eight sequential bitlines with the pattern repeating for each block of eight sequential bitlines.

The illustrated embodiment of the bitlines BLX may include four bitlines, which are labeled BLq, BLr, BLs, and BLt in FIG. 3A. The bitlines BLq, BLr, BLs, and BLt may represent four sequential bitlines of the pixel array. For example, BLq, BLr, BLs, and BLt may represent BL0, BL1, BL2, and BL3.

At the intersection of the bitlines BLX and the S&H control lines shx<X> may be disposed the S&H control circuitry 314. The S&H control circuitry 314 includes an S&H SW and an S&H C. The S&H C may be coupled to a respective bitline by the S&H SW to be charged by a pixel voltage on the respective bitline. The S&H SW may be coupled to one of the S&H control lines shx<X> to control the opening and closing of the S&H SW. In some embodiments, the S&H control lines may be hardwired to the S&H SWs. However, in other embodiments, the coupling of the S&H control wires to the S&H SWs may be dynamically changed. Alternatively, the trand of the S&H control signals provided on the S&H control lines may be dynamically changed. Yet, if either the coupling or trand is dynamically changed, it may be desirable that adjacent bitlines are not coupled to the same S&H control line or driven by the same S&H control signal.

Figure 3B:
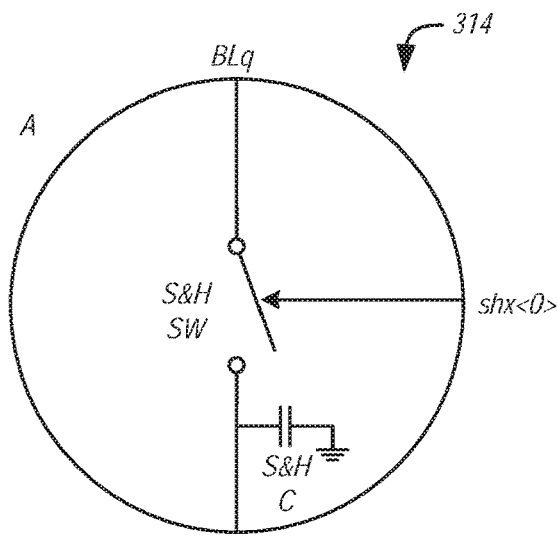
FIG. 3B is an example of S&H control circuitry 314 in accordance with an embodiment of the present disclosure.

FIG. 3B is an example of S&H control circuitry 314 in accordance with an embodiment of the present disclosure. The S&H control circuitry 314 may be an example of the S&H control circuitry of inset 114 of FIG. 1. The illustrated embodiment of the S&H control circuitry 314 includes S&H SW and S&H C. The illustrated embodiment of the S&H SW is shown to be a switch coupled to S&H control line shx<0>. Although S&H SW is depicted as a standard open/close switch, in some embodiments the S&H SW may be a transistor having a gate terminal coupled to the S&H control line shx<0> with the drain/source terminals coupled to the bitline BLq and the S&H C. However, the type of switch implemented as the S&H SW is a non-limiting aspect of the present disclosure. The S&H SW may be coupled on one side to bitline BLq and coupled to A/D conversion circuitry, such as A/D conversion circuitry 110, on the other side. Additionally, the S&H C may be coupled to the S&H SW on the same side as is coupled to the A/D conversion circuitry. The S&H C may be coupled between ground and the S&H SW to charge to a voltage on bitline BL1 when the S&H SW is closed. The S&H C may be any capacitor known in the art, such as an MIS (metal-insulator-semiconductor) capacitor or a MOS (metal-oxide-semiconductor) capacitor.

In operation, an S&H control signal on the S&H control lines shx<X> may cause all S&H SWs to close in concert, but each S&H SW may be randomly opened due to respective S&H control signals having a different trand time, e.g., a different time to transition low and open the switches.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An apparatus comprising:
 readout circuitry coupled to receive image data from an array of pixels via a plurality of bitlines, the readout circuitry including a plurality of sample and hold (S&H) circuits coupled to respective ones of the plurality of bitlines to sample and hold the image data in response to a plurality of S&H control signals provided by control circuitry, each of the plurality of S&H circuits including:
  an S&H capacitor coupled to sample and hold respective image data; and
  an S&H switch having one side coupled to a respective bitline of the plurality of bitlines and having an opposite side coupled to the S&H capacitor, and further coupled to receive a respective one of the plurality of S&H control signals provided by the control circuitry to open and close the S&H switch,
 wherein each of the plurality of S&H switches are opened to decouple their respective S&H capacitors from the respective bitlines at a different randomized time in response to a respective one of the S&H control signals provided by the control circuitry,
 wherein each of the plurality of S&H switches are hardwired to an S&H control line of a plurality of S&H control lines in a random pattern.

2. The apparatus of claim 1, wherein the plurality of S&H control lines is less than the plurality of bitlines.

3. The apparatus of claim 2, wherein the random pattern the plurality of S&H control lines is coupled to a respective number of S&H control switches repeats for the plurality of bitlines.

4. The apparatus of claim 1, wherein each of the plurality of S&H control signals includes a minimum hold time and a random additional hold time, and wherein the random additional hold time is different for each of the plurality of S&H control signals.

5. An imaging system, comprising:
 a pixel array including a plurality of pixels arranged in rows and columns, and further including a plurality of bitlines, with each of the plurality of bitlines associated with one of the columns, wherein each pixel of the pixel array photogenerates image data in response to image light;
 control circuitry coupled to provide a plurality of sample and hold (S&H) control signals;
 readout circuitry coupled to the plurality of bitlines, wherein the readout circuitry is coupled to receive the image data from the pixel array and perform analog-to-digital conversion of the image data, wherein the readout circuitry is coupled to sample and hold (S&H) the image data, and wherein the readout circuitry includes a plurality of S&H circuits coupled to the plurality of bitlines and coupled to receive the plurality of S&H control signals provided by the control circuitry, each of the plurality of S&H circuits comprising:
  an S&H capacitor coupled to sample and hold respective image data; and
  an S&H switch having one side coupled to a respective bitline of the plurality of bitlines and having an opposite side coupled to the S&H capacitor, and further coupled to receive a respective one of the plurality of S&H control signals provided by the control circuitry to open and close the S&H switch,
 wherein each of the plurality of S&H switches are opened to decouple their respective S&H capacitors from the respective bitlines at a different randomized time in response to a respective one of the S&H control signals provided by the control circuitry,
 wherein each of the plurality of S&H switches are hardwired to an S&H control line of a plurality of S&H control lines in a random pattern.

6. The imaging system of claim 5, wherein each of the plurality of S&H control signals includes a minimum hold time and a random additional hold time, and wherein the random additional hold time is different for each of the plurality of S&H control signals.

7. The imaging system of claim 5, wherein each one of the plurality of S&H circuits is coupled to one of the plurality of S&H control lines, the plurality of S&H control lines coupled to deliver the plurality of S&H control signals.

8. The imaging system of claim 5, wherein the plurality of S&H control lines is less than the plurality of bitlines, and wherein the plurality of S&H control lines is coupled to a respective number of bitlines of the plurality of bitlines.

9. The imaging system of claim 8, wherein the plurality of S&H control lines is coupled to a respective number of bitlines of the plurality of bitlines in a random pattern.

10. The imaging system of claim 9, wherein the random pattern repeats for the plurality of bitlines.

11. The imaging system of claim 5, wherein the readout circuitry further comprises an analog-to-digital converter coupled to receive the image data from the plurality of S&H circuits.

12. A method to randomly sample pixel voltage across a row of pixels, the method comprising:
 transferring reference image data from each pixel of a row of pixels to a respective bitline of a plurality of bitlines;
 simultaneously coupling the plurality of bitlines to a respective sample and hold (S&H) capacitor of a plurality of S&H capacitors in response to a plurality of S&H control signals provided by control circuitry to charge the S&H capacitor with the reference image data from a respective pixel of the row of pixels; and decoupling each of the plurality of S&H capacitors from the respective bitline of the plurality of bitlines at different randomized times in response to the plurality of S&H control signals provided by the control circuitry.

13. The method of claim 12, wherein each S&H control signal of the plurality of S&H control signals simultaneously transitions to a high logic level to simultaneously couple the plurality of bitlines to a respective S&H capacitor, and wherein each S&H control signal of the plurality of S&H control signals transitions to a low logic level at the different randomized time to decouple each of the plurality of S&H capacitors from their respective bitline.

14. The method of claim 12, wherein simultaneously coupling the plurality of bitlines to a respective S&H capacitor of a plurality of S&H capacitors in response to a plurality of S&H control signals comprises:
providing the plurality of S&H control signals to a plurality of S&H switches to cause each of the plurality of S&H switches to simultaneously close, wherein causing each of the plurality of S&H switches couples the plurality of bitlines to their respective S&H capacitors.

15. The method of claim 12, wherein decoupling each of the plurality of S&H capacitors from the respective bitline of the plurality of bitlines at different randomized times in response to the plurality of S&H control signals comprises:
providing the plurality of S&H control signals to a plurality of S&H switches to cause each of the plurality of S&H switches to open at the different randomized times, wherein causing each of the plurality of S&H switches decouples the plurality of bitlines from their respective S&H capacitors.

16. The method of claim 12, wherein each S&H control signal of the plurality of control signals has a minimum hold time at a high logic level and the different randomized time before transitioning to a low logic level, wherein a transition to the high logic level occurs at a same time for each of the plurality of S&H control signals, and wherein the different randomized time before transitioning low is different for each S&H control signal of the plurality of S&H control signals.

* * * * *